United States Patent [19]
Perinet

[11] Patent Number: 4,629,148
[45] Date of Patent: Dec. 16, 1986

[54] APPARATUS FOR AERIAL SCATTERING

[76] Inventor: Roland J. Y. Perinet, Route de Poitiers, Mirebeau, Vienne, France

[21] Appl. No.: 718,210

[22] Filed: Apr. 3, 1985

Related U.S. Application Data

[63] Continuation of Ser. No. 529,006, Sep. 7, 1983, abandoned, which is a continuation of Ser. No. 352,162, Feb. 25, 1982, abandoned.

[30] Foreign Application Priority Data

Mar. 6, 1981 [FR] France .................. 81 04491

[51] Int. Cl.[4] ............................................. B64D 1/18
[52] U.S. Cl. ...................................... 244/136; 239/171
[58] Field of Search .......... 244/136, 4 R, 13, DIG. 1; 248/182; 239/163, 164, 166, 167, 168, 169, 171

[56] References Cited

U.S. PATENT DOCUMENTS

| | | | |
|---|---|---|---|
| 1,022,903 | 4/1912 | Warrick | 244/DIG. 1.4 |
| 2,754,151 | 7/1956 | Williamson | 239/164 |
| 3,135,483 | 6/1964 | Girard | 244/DIG. 1 |
| 3,428,276 | 2/1969 | Hubbard | 244/136 |
| 3,936,018 | 2/1976 | Barlow | 244/136 |
| 4,158,448 | 6/1979 | Mochizuki | 244/13 |

FOREIGN PATENT DOCUMENTS

| | | | |
|---|---|---|---|
| 481470 | 3/1952 | Canada | 244/136 |
| 2909737 | 9/1980 | Fed. Rep. of Germany | 239/171 |
| 1469662 | 2/1967 | France . | |
| 2372082 | 6/1978 | France . | |
| 2430196 | 3/1980 | France | 239/171 |
| 717249 | 10/1954 | United Kingdom | 239/166 |

*Primary Examiner*—Trygve M. Blix
*Assistant Examiner*—Rodney Corl
*Attorney, Agent, or Firm*—Christel, Bean & Linihan

[57] ABSTRACT

Apparatus for aerial scattering or spreading comprising a flying wing formed by an aerofoil from which a frame is suspended by a mast and on which frame there is a cockpit and at least one engine driving a propeller. A scattering device is mounted on the flying wing and comprises a laterally extending spraying or atomizer tube, at least one tank for the product to be scattered and connected to a motor-driven pump, the pump being connected to the tube, and a control for regulating the flow and/or pressure of the product to be scattered.

11 Claims, 6 Drawing Figures

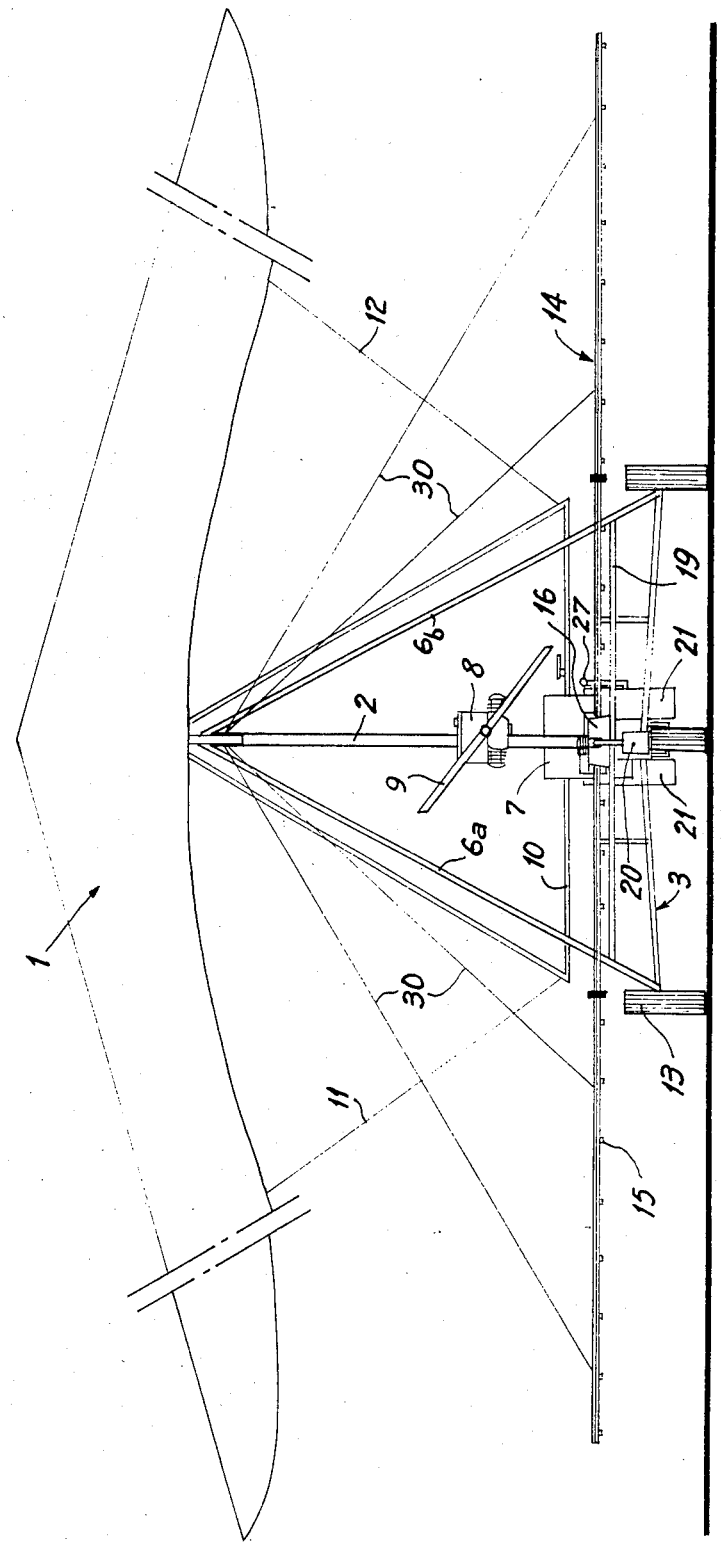

APPARATUS FOR AERIAL SCATTERING

This application is a continuation, of application Ser. No. 529,006, filed Sept. 7, 1983 as a continuation of application Ser. No. 352,162 filed Feb. 25, 1982 and now abandoned.

The present invention relates to an apparatus for aerial scattering or spreading which, of course, finds a preferential application in the sphere of agriculture.

The treatment of crops and even the application of fertilizer are carried out by ground spreading or scattering, i.e. by means of apparatus mounted on a tractor, drawn by tractor and sometimes even carried on a man's back, or by aerial scattering from aircraft or helicopters.

In fact, an aeroplane has very often been used for scattering products, in particular in the regions of large-scale farming, such as in the United States, since it is the only means enabling large areas to be treated in a minimum amount of time. A helicopter, on the other hand, makes it possible to treat crops situated in places to which access is difficult or when the configuration of the field is irregular.

The use of these aircraft increases the prime cost of these treatments and this applies particularly to the helicopter, which can only be justified if the cultivation provides a considerable extra yield or if the profit is proportional in relation to the conventional methods of treatment.

Furthermore, an aeroplane is dependent upon airstrips, as is a helicopter which, in addition, requires high-grade maintenance.

When using these aircraft it is only possible for scattering to take place during the phase of horizontal flight and not when turning or banking, which is also an additional cause of expense: the time required for turning is time lost.

Accordingly, it is an object of the invention to provide an apparatus for aerial scattering which makes it possible to achieve lower treatment costs.

The subject-matter of the invention is an apparatus of this type which does not necessitate any specific structure, in contrast to an aeroplane or helicopter for example.

This object and this subject-matter, as well as others which will become apparent in what follows, are arrived at by the apparatus according to the present invention, which is intended for aerial scattering or spreading and which comprises a flying or delta wing formed by an aerofoil from which a frame is suspended by means of a mast, on which frame there are arranged in particular at least one engine driving a propeller and a cockpit, and a scattering device which is mounted on this flying wing and which comprises a spraying or atomizer tube, at least one tank for the product to be scattered connected to a pump driven by a motor, the pump itself being connected to this tube, and means for controlling and/or regulating the flow and/or pressure of the product to be scattered.

Preferably, the spraying tube is composed of three elements, one mounted to the rear of the frame and the other two on either side of the frame in detachable manner, and said tube is guyed on the aerofoil structure.

According to another embodiment of the invention, this tube is secured to the flying wing in pendular manner.

Advantageously, this tube comprises in its middle a transverse spindle which is situated in a transverse groove in a U-shaped member mounted to the rear of the frame; the tube is thus able to pivot about its spindle between the two arms of the U of this member, and one end of this spindle is extended downwards by a weight.

Preferably, the tank or tanks are of compartmented design.

An apparatus of this type may be piloted manually or remote-controlled from the ground.

The description which follows and which is not of a restrictive nature will permit a better understanding of the advantages of the invention and the way in which it is put into practice. It should be read with reference to the attached drawings, in which:

FIG. 3 is a rear view of the apparatus shown in FIG. 2;

Figure 1:
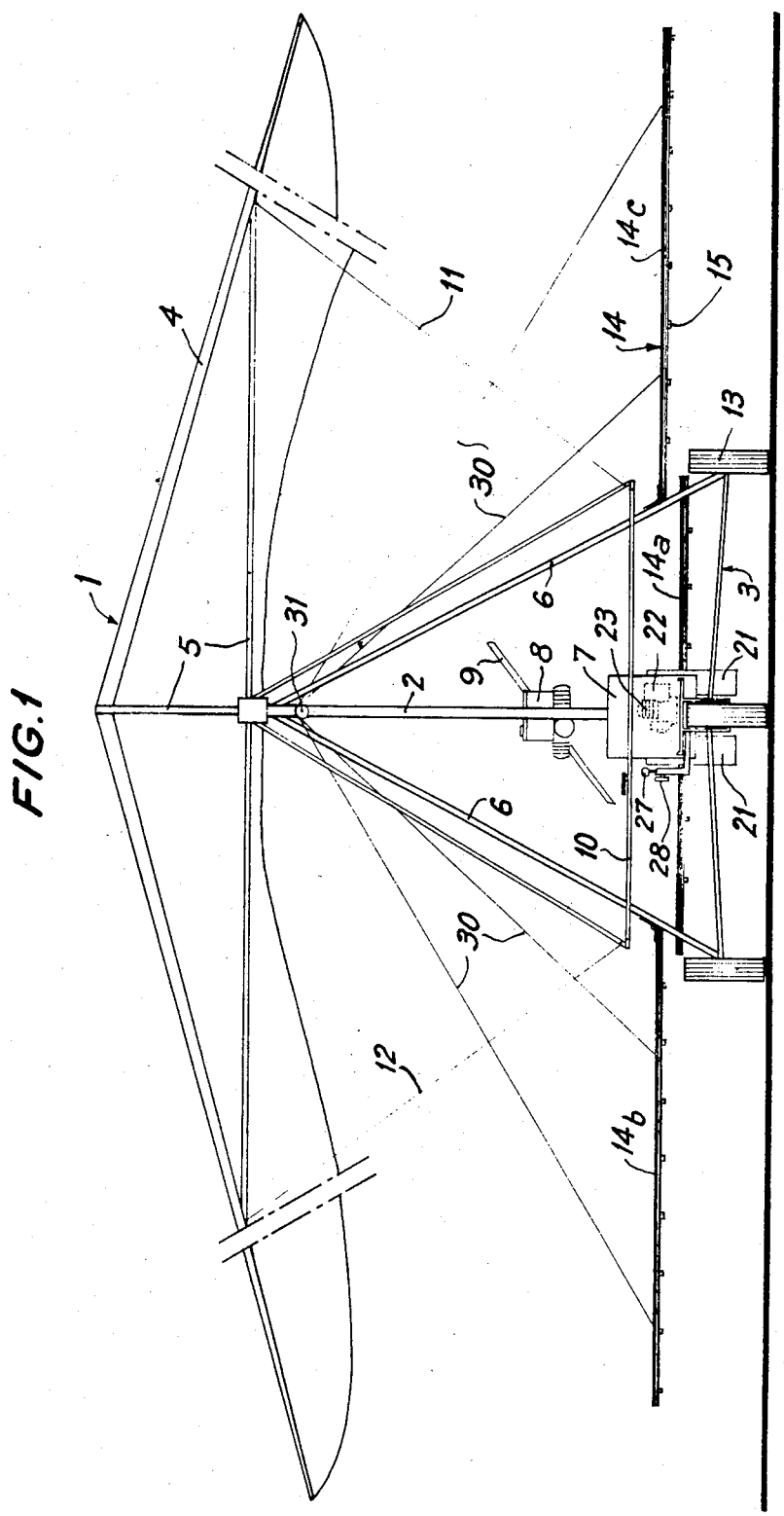
FIG. 1 illustrates, in a front view, a first mode of embodiment of the invention.
Figure 2:
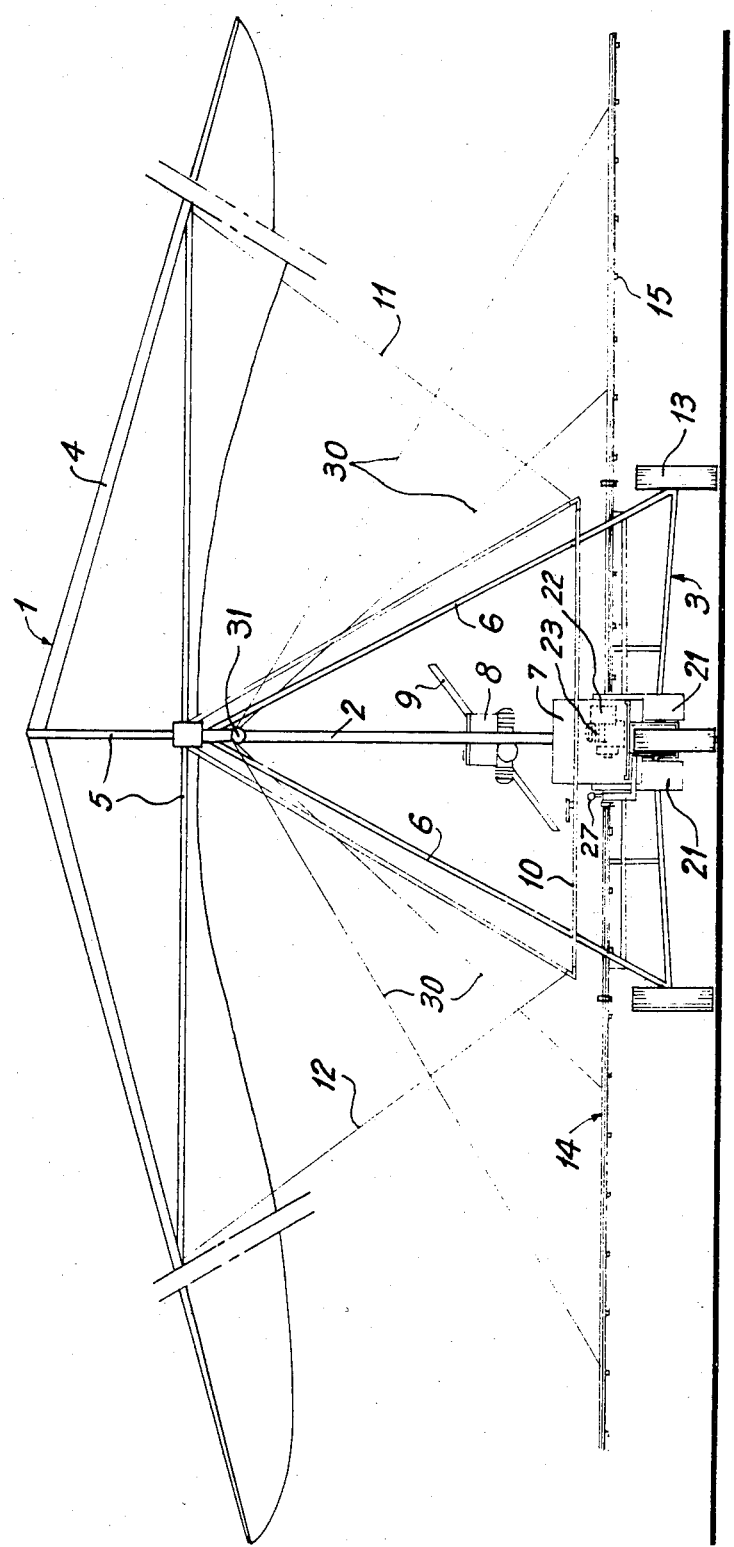
FIG. 2 illustrates, in a front view, a second mode of embodiment of the invention.

As evident from FIGS. 1 to 3, an apparatus according to the invention for aerial scattering comprises a flying wing which is generally designated 1, from which a frame 3 is suspended by means of a mast 2.

This flying wing is formed by an aerofoil 4 mounted on a superstructure 5 which can be folded up.

The frame 3 is itself connected to the mast 2 by struts 6 which are at least three in number, as in the embodiments shown in the drawings. A seat 7 for the pilot is disposed on this frame 3 and behind the seat an engine 8 which drives a propeller 9. The engine is securely attached to the mast 2 by any known means.

For steering the apparatus, the pilot is provided with a transverse bar 10 mounted to swing on the mast 2 and connected to the superstructure 5 of the flying wing 1 by cords 11 and 12. According to the circumstances, it is possible to consider providing on the frame 3 two engines each driving a propeller, in particular when the apparatus has to carry two pilots.

The engine 10 may be of the multi-fuel type.

The frame 3 is provided with wheels 13 enabling the apparatus to move on the ground and serving as an undercarriage. It thus constitutes a tricycle which, according to a particular embodiment, can likewise be folded up, in accordance with the Design filed in France on June 20, 1980 under No. 11 738. To the rear of this frame 3, therefore behind the pilot's seat 7, a spraying tube 14 which comprises nozzles 15 or rotating atomizers is arranged.

According to a first embodiment of the invention, which is illustrated in FIG. 1, the tube 14 is composed of three elements: a first element 14a situated to the rear of the frame 3 itself, and two elements 14b and 14c arranged on either side thereof and mounted detachably on the struts 6.

According to a second embodiment illustrated in FIGS. 2 to 5, the spraying tube 14 is mounted on the frame 3 in pendular manner by means of a U-shaped member 16.

According to this embodiment, this member 16 is securely fastened to a beam 19 connecting the two rear struts 6a and 6b, and is arranged in its middle. The member 16 comprises a transverse groove 17, i.e. perpendicular to this beam.

The tube 14 itself comprises in its middle a transverse spindle 18, which, when the tube 14 is mounted in the member 16, is accommodated in the groove 17. Externally, this spindle 18 is extended downwards by a weight 20. Of course, at each end of the spindle 18 there could likewise be provided another weight.

It will be readily understood that, as a result of this weight 20, the spraying tube 14 is kept horizontal whatever the movements of the apparatus, since it can pivot freely about its spindle 18 in the member 16.

In addition to this spraying tube 14, the scattering or spreading device comprises at least one tank 21, preferably of compartmented design, which contains the product to be scattered, a pump 22 driven by a motor 23 and also means for controlling and/or regulating the flow and pressure of the product to be scattered.

For obvious reasons of equilibrium, it is advantageous for the apparatus to comprise two tanks 21. It is even possible to replace the weight 20 with a tank 21.

Figure 6:
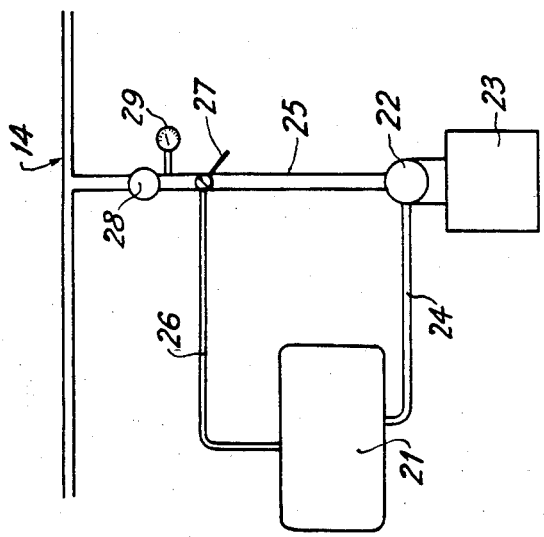
FIG. 6 illustrates diagrammatically the spraying device.
Figure 5:
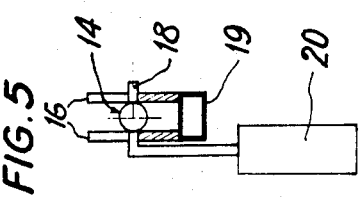
FIG. 5 is a section along the lines AA in FIG. 4.
Figure 4:
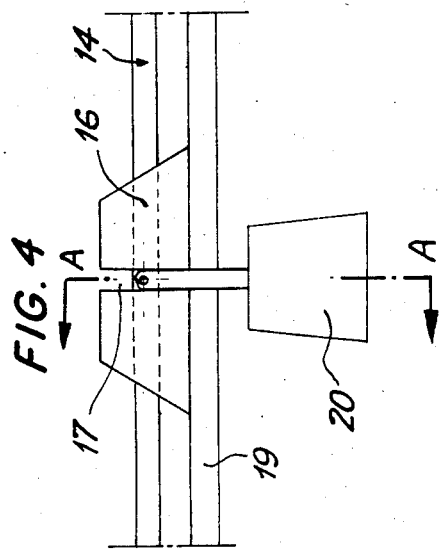
FIG. 4 shows the mounting of the tube on the frame of the apparatus illustrated in FIGS. 2 and 3.

As illustrated in FIG. 6, this tank 21 is connected through a first pipe 24 with the pump 22 which is itself connected with the tube 14 through a second pipe 25. Moreover, a duct 26 connects the tank 21 with this second pipe 25; it is thus possible to form a closed circuit between the tank and the pump. In fact, as the motor 23 for the pump 22 is started up immediately upon take-off, it is necessary for such a closed circuit to be provided so as not to supply the tube 14.

The supply to the tube 14 is controlled, for example, by a hand lever 27 which is disposed within reach of the pilot, the latter is thus able to stop or start the scattering of the product contained in the tank 21 and regulate its flow. Downstream of this hand lever 27 there is likewise arranged in the second pipe 25 a control 28 for regulating the scattering pressure which is measured, for example, by a pressure gauge 29 situated at this level.

The pump 22 is itself supported by the frame 3 and the motor 23 which drives it is likewise arranged on this frame.

Because of its length (6 to 12 meters according to requirements, for example), the spraying tube 14 is guyed: the guys 30 connect it to a member 31 situated at the top of the mast 2. In the case in which the tube is mounted in pendular manner, this member 31 can rotate freely about the axis which secures it to the mast 2.

It is thus apparent that with the same equipment it is possible to effect scattering operations either by having previously regulated the pressure or at a pressure which can be maintained constant by means of the regulating control 28.

An apparatus of this type makes possible aerial scattering of the different products required for treating crops in particular or, more generally, any tract of land or even maritime or like expanses. These products may be liquid, solid or gaseous. In the latter case, the advantages offered by this apparatus will be appreciated by taking into consideration its slot speed of movement in relation to the aircraft used at present.

Furthermore, it is to be noted that the spraying device is such that the characteristics of the pump and the diameter of the nozzles or rotating atomizers permit the distribution of product in amounts per hectare complying with the directions of the supplies of these products. The apparatus according to the present invention is particularly suitable for scattering operations at low distribution, for example from 15 to 25 liters per hectare.

This apparatus can be remote-controlled. To achieve this, it is sufficient to install on the frame 3 the necessary equipment for guiding its flight and also for operating the lever 27 and the control 28.

As a result of its construction and the lightness of its components, this apparatus can be easily dismantled and, therefore, readily conveyed from one treatment zone to another.

Of course, no departure from the scope of the present invention will arise from the use of equivalents of the different components of this apparatus and, in particular, by replacing the spraying tube 14 with a micronizing tube or pipe, or by driving the pump 22 by any other means, including by one of the propelling engines 8.

I claim:

1. Apparatus for aerial scattering or spreading, characterised in that it comprises a flying wing formed by an aerofoil 4 from which a frame 3 is suspended by means of a mast 2, on which frame there is arranged in particular a cockpit and at least one engine 8 driving a propeller 9, and a scattering device which is mounted on said flying wing and which comprises a spraying or atomizer tube secured to said flying wing in pendular manner, said tube 14 comprising in its middle a transverse spindle 18 which is situated in a transverse groove 19 provided in a U-shaped member 16 securely fastened to the frame 3, one of the ends of said spindle 18 being extended downwards by a weight 20, at least one tank 21 for the product to be scattered connected to a pump 22 driven by a motor 23, the pump itself being connected to said tube, and means for controlling and/or regulating the flow and/or pressure of the product to be scattered.

2. Apparatus according to claim 1, characterised in that said weight 20 is formed by a tank 21 for product to be scattered.

3. Apparatus for aerial scattering or spreading, characterised in that it comprises a flying wing formed by an aerofoil 4 from which a frame 3 is suspended by means of a mast 2, on which frame there is arranged in particular a cockpit and at least one engine 8 driving a propeller 9, and a scattering device which is mounted on said flying wing and which comprises an elongated spraying or atomizer tube 14, means for mounting said tube 14 to said flying wing in pendular manner, said pendular mounting means comprising means 16,18 carried by said frame for providing a pivotal connection to said tube 14 mid-way between the ends thereof and gravity responsive means 20 operatively connected to said tube 14 adjacent said pivotal connection for maintaining said tube 14 in a substantially horizontal position during pivotal movement thereof relative to said frame, at least one tank 21 for the product to be scattered connected to a pump 22 driven by a motor 23, the pump itself being connected to said tube, and means for controlling and/or regulating the flow and/or pressure of the product to be scattered.

4. Apparatus according to claim 3, characterized in that said gravity responsive means 20 comprises a weight formed by a tank 21 for product to be scattered.

5. Apparatus according to claim 3, characterized in that said tube 14 is guyed.

6. Apparatus according to claim 3, characterized in that said at least one tank 21 is compartmented.

7. Apparatus according to claim 3, characterized in that said apparatus is remote controlled.

8. Apparatus according to claim 3, wherein said aerofoil includes a superstructure and the apparatus further comprises a transverse bar mounted to swing on said mast and connected to said superstructure and adapted to be controlled by the pilot of the apparatus for inclining the aerofoil according to the desired direction or slope.

9. Apparatus according to claim 3, further including a plurality of wheels rotatably mounted on said frame whereby the head and horizontality of said frame are not modifided by the lacing and slope movements of the wing due to wind and turbulence.

10. Apparatus according to claim 3, wherein said frame is turnable relative to said aerofoil by means of said mast.

11. Apparatus for aerial scattering or spreading, characterised in that it comprises a flying wing formed by an aerofoil 4 from which a frame 3 is suspended by means of a mast 2, on which frame there is arranged in particular a cockpit and at least one engine 8 driving a propeller 9, and a scattering device which is mounted on said flying wing and which comprises a spraying or atomizer tube 14, means for mounting said tube 14 to said flying wing in pendular manner at a location below said aerofoil 4, pulley means 31 rotatably connected to said mast 2 between said aerofoil 4 and said tube 14, guy means 30 connected to said tube 14 and to said pulley means 31, at least one tank 21 for the product to be scattered connected to a pump 22 driven by a motor 23, the pump itself being connected to said tube, and means for controlling and/or regulating the flow and/or pressure of the product to be scattered.

* * * * *